No. 872,975. PATENTED DEC. 3, 1907.
C. E. SARGENT.
APPARATUS FOR WASHING GAS.
APPLICATION FILED JAN. 16, 1907.
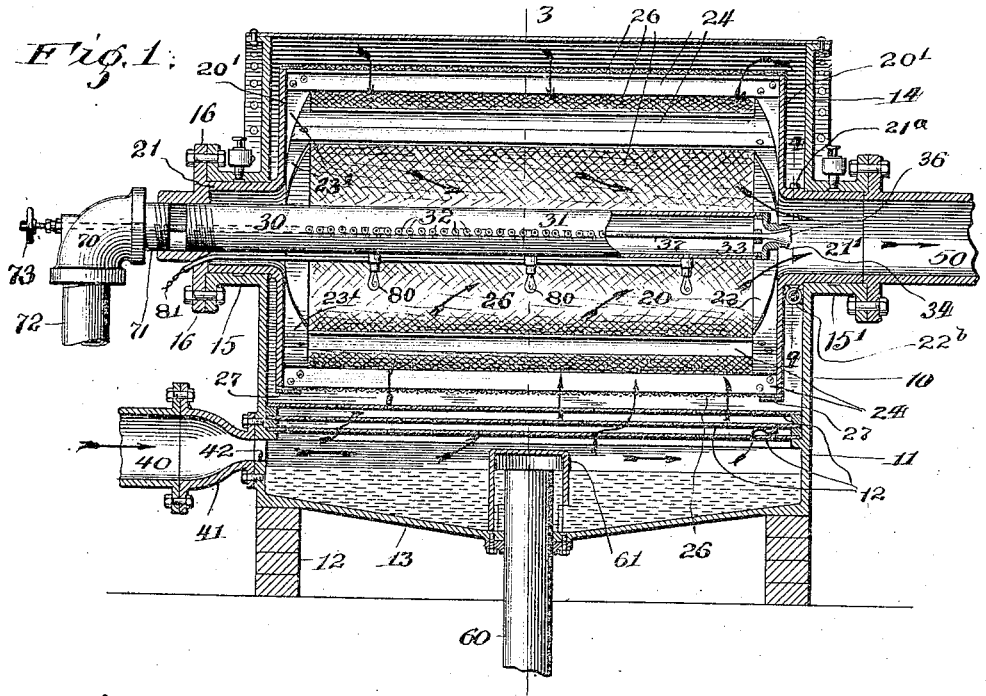
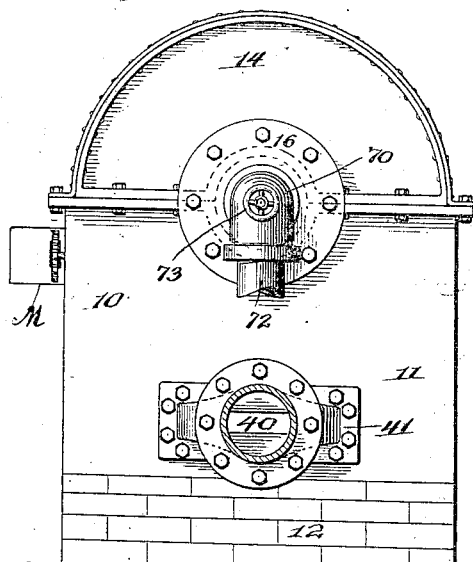
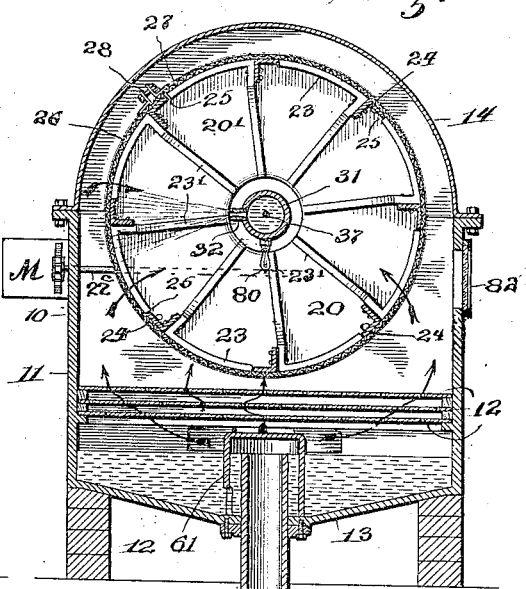
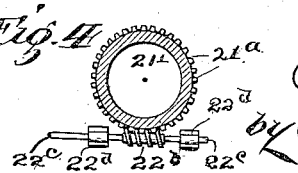
Witnesses:
Wm. P. Bond
Leone S. Russell
Inventor:
Charles E. Sargent,
by Charles O. Shurvey
Atty

UNITED STATES PATENT OFFICE.

CHARLES E. SARGENT, OF CHICAGO, ILLINOIS, ASSIGNOR TO SARGENT ENGINEERING COMPANY, OF BRONXVILLE, NEW YORK, A CORPORATION OF NEW YORK.

APPARATUS FOR WASHING GAS.

No. 872,975.

Specification of Letters Patent.

Patented Dec. 3, 1907.

Application filed January 16, 1907. Serial No. 352,586.

*To all whom it may concern:*

Be it known that I, CHARLES E. SARGENT, a citizen of the United States, residing in the city of Chicago, in the county of Cook and State of Illinois, have invented certain new and useful Improvements in Apparatus for Washing Gas, of which the following is a full, clear, and exact description.

My invention relates to certain new and useful improvements in apparatus for washing gas, its object being to produce a simple and efficient apparatus by which dust and other foreign particles may be separated from the gas. A common expedient for washing gas is to pass the same through a filtering medium and to pass along with it a spray or stream of water, the water and filtering medium serving to separate the foreign matter from the gas. While this method and devices of this construction are quite effective in their operation, yet the filtering medium, in a short time becomes filled up with the foreign substances, the separation becomes less complete and it frequently becomes necessary to replace the filtering medium.

One of the objects of my invention is to provide means for cleaning the filtering medium, while the gas is being washed, thereby preventing the passage of foreign substances into or through the filtering medium. In the present apparatus I cause the gases to pass through the filtering wall in one direction and simultaneously project a spray, stream or body of washing fluid,—preferably water, through the filtering wall from the opposite side, said spray, stream or body of washing fluid not only serving to wash the gas but to simultaneously knock the foreign substances from off the filtering wall, practically as soon as they lodge upon its surface. The danger of the filtering medium becoming filled up with foreign substances is therefore practically avoided and a more perfect separation effected.

The invention is fully described in this specification and clearly illustrated in the accompanying drawings in which Figure 1 is a central vertical section through an apparatus embodying my invention. Fig. 2 is an end view thereof. Fig. 3 is a vertical cross section taken on the line 3—3, Fig. 1, and Fig. 4 is a similar section taken on line 4—4 Fig. 1.

As shown in the drawings the apparatus comprises in general, a casing 10 in which is mounted a rotatable filtering drum 20, a water spraying device 30, an inlet 40 for the impure gas, an outlet 50 for the washed gas, and an outlet 60 for the escape of the water. The casing 10, is preferably constructed of a rectangular base portion 11, supported upon a suitable foundation 12, and having a hopper like bottom 13, through which extends the water escape pipe 60. Said pipe 60 extends up approximately to the level of the lower inner edge of the gas inlet 40, and is covered by a perforated hood 61, the perforations of which are below the top of this pipe, thus providing a trap to prevent the escape of the gas at this point. The base portion 11 is closed by a cover 14, that may be bolted or otherwise secured thereto and said base portion and cover contain the two halves of two bearings 15, $15^1$ in which are journaled the two hollow trunnions 21, $21^1$ of the filtering drum 20.

A fitting 16 is bolted to the bearing 15 and communicates with an elbow 70, through a nipple 71, a water supply pipe 72 entering the other arm of the elbow 70, and connecting with a suitable source of water supply. A spraying pipe 31 of the spray device 30 is threaded in the fitting 16 and extends through the drum 20, the pipe 31 being provided with a series of nozzles 32 that are adapted to project the water against the inner side of the wall of the drum with sufficient force that a considerable portion thereof will pass through the interstices thereof and that the impact will jar or agitate the wall sufficiently to knock off foreign matter, the spray which passes through carrying the foreign matter off with it. The end 33 of the pipe 31 is closed by an inspirator 34 having a central flaring opening which is closed by a plug 36, mounted upon a stem or rod 37 extending through the pipe 31, fitting 16, nipple 71 and elbow 70, and operated by a hand wheel 73. The inspirator may be opened at will to facilitate the movement of the gas through the filter. The escape pipe 50 is bolted to the bearing 15¹ and conducts the washed gas away from the apparatus.

The filtering drum 20 contains two ends or heads 20¹ that are integral with the hollow trunnions 21, 21¹ that are journaled in the bearings 15, 15¹, the trunnion 21¹ bearing a gear 21ª that meshes with a worm 22ᵇ. The worm is fast upon a shaft 22ᶜ journaled in brackets 22ᵈ secured upon the end wall of the base 11, and said shaft may be connected to any suitable motor M to effect its rotation. In this manner a slow rotation of the drum may be effected, so that its entire cylindrical surface will be moved through the path of the spray from the nozzles, 32. The heads 20¹ are formed with peripheral flanges 23 and ribs 23¹ and the heads are connected by bars 24, preferably in the form of angle irons, said bars being riveted or otherwise secured to the ribs 23¹ of the heads 20¹. The flanges 23 are cut away as at 25 and receive the bars 24, the outer faces of said bars lying flush with the peripheries of the heads and extending from the inner face of the one head to the inner face of the other. The two heads and connecting bars make up a frame for the drum which is covered with a filtering medium preferably in the form of a sheet of canvas 26 and held in place thereon by clamping rings 27, the ends of which are connected and drawn together by bolts and nuts 28.

The base 11 has supported therein a plurality of perforated plates 12, through the perforations of which the impure gases pass in one direction and the water, which escapes from the drum, passes in the opposite direction. The inlet pipe 40 is connected to the base 11 by a fitting 41 bolted to the base, and as above stated the lower edge 42 of the opening in the fitting 41 is approximately flush with the top of the outlet pipe 60 so that the inflowing gas passes over the body of water in the base, where considerable of the impurities are removed in the first instance.

A series of electric lights 80 are provided within the drum, preferably by mounting them upon the pipe 31, and the conducting cord 81 thereof extends out through the fitting 16 as shown in Fig. 1. Windows 82 are provided in the wall of the base 11, opposite each light, through which windows the interior of the apparatus may be viewed and the condition of the parts therein observed.

The operation of the apparatus and method by which the gas is washed is as follows:— Water being forced into the spraying device is projected out through the nozzles 32, in a spray or shower, striking the canvas wall of the filtering drum with force enough to pass through the interstices thereof in a fine spray, thereby jarring the wall and knocking off any foreign matter which may have lodged thereon, and carrying the same away with it, part of the water passing out through the wall. The weight of the water as it fills the angle iron bars 24, will revolve the drum, the gearing and motor being omitted and this in many cases may be sufficient for this purpose. When the motor and gearing are used the drum may be slowly rotated by the motor through the medium of the gearing. The wall of the drum will thus become saturated and remain in this condition so long as the spray of water is maintained. I find that saturated closely woven fabric forms an effectual filter for the gas, especially blast furnace gas, and because of the fact that the filtering medium is thin and porous it requires very little pressure to cause the gas and water to pass through the same. However, if the difference of pressure upon one side of the filtering medium is not sufficient to move the gas, the inspirator 34 may be opened and the inspirator action produced which will facilitate the movement of the gas. The water passes out through the filter in a fine spray carrying off the dust and falls upon the uppermost plate 12, through the perforations of which it readily passes to the next plate, where it passes on to the next plate and so on until it collects in the bottom of the base where it flows out through the trap 61 and is carried away by the pipe 60. The gas being admitted through the pipe 40 first passes over the body of water in the base where some of its impurities are deposited; then it passes through the perforated plates 12, in an opposite direction to that of the falling water, the effect being to break up the gas and scrub or wash it as the two pass each other in opposite directions. It is to be understood that it does not pass through any body of water between the plates as the water does not flow fast enough to fill up the spaces between the plates, but it comes in contact with the water while passing through the perforations. The plates serve the purpose of cooling the gas besides assisting in the cleaning thereof. After passing the plates the gas percolates through the water saturated wall of the filtering drum, leaving the dust and other solid foreign matter on the outer face thereof, the spray of water, however, washing the foreign matters from the outer face of the filtering medium. Here also the direction of movement of the gas and water is opposite which not only causes more effective scrubbing or washing, but the effect is to force the dust away from the filter rather than to allow it to pass into the filter and clog it up. The straining or filtering of the gas is thus accomplished with greater ease, with less danger of the clogging up of the filter and consequently the frequent renewal of the filtering material.

I am aware that various alterations and modifications of the device are possible and I do not therefore desire to limit myself to the specific construction thereof except as pointed out in the following claims.

I claim as new and desire to secure by Letters Patent.

1. In a device of the class described the combination with a filtering wall through which the gas passes in one direction, of means for projecting a washing fluid through the wall from the side opposite to that in which the gas enters and simultaneously agitating or jarring the wall to knock off any foreign matter.

2. In a device of the class described the combination with a filtering wall through which gas is passed in one direction to filter it, of a spraying device upon the opposite side of the wall, which is arranged to forcibly project a spray across the surface of the wall with sufficient force to knock off foreign matter, and to cause a considerable portion of the spray to pass through the interstices of the wall and carry away said foreign matter, said drum and spraying device being relatively movable.

3. In a device of the class described the combination with a cylindrical filtering wall, through which the gas passes in one direction, of a spraying device arranged to forcibly project the spray through the wall in a direction opposite to that in which the gas enters with sufficient force to agitate said wall and knock off foreign matter, said wall and spraying device being relatively rotatable.

4. In a device of the class described the combination with a rotatable cylindrical filtering wall, through which the gas passes in one direction, of a spraying device adapted to forcibly project a spray through the wall in a direction opposite to that in which the gas enters with sufficient force to agitate said wall and knock off foreign matter.

5. In a device of the class described, the combination with a rotatable cylindrical filtering wall, of a water supply pipe within said cylindrical wall, a plurality of nozzles upon said supply pipe arranged to project a spray upon the inner surface of the wall, a casing inclosing said filtering wall, having an inlet for the gas, and a gas outlet communicating with the cylindrical filtering wall.

6. In a device of the class described the combination with a drum, having a cylindrical filtering wall, of a spray device within said drum, arranged to project a spray upon the inner surface of the filtering wall, a casing inclosing said filtering wall, having an inlet for the gas, and a gas outlet communicating with the cylindrical filtering wall.

7. In a device of the class described the combination with a drum having a cylindrical filtering wall, of a spraying device within said drum, said drum and spraying device being relatively rotatable and said spraying device being arranged to project a spray upon the inner surface of the filtering wall, a casing inclosing said filtering wall, having an inlet for the gas, and a gas outlet communicating with the cylindrical filtering wall.

8. In a device of the class described the combination with a rotatable drum having a cylindrical filtering wall, of a spraying device within said drum, arranged to project a spray upon the inner surface of the filtering wall, a casing inclosing said filtering wall, having an inlet for the gas, and a gas outlet communicating with the cylindrical filtering wall.

9. In a device of the class described the combination with a drum containing a cylindrical wall of woven fabrics through which the gas passes in one direction, of a spraying device, adapted to forcibly project water or other gas washing fluid through the fabric in a direction opposite to that in which the gas enters with sufficient force to agitate the filtering wall and knock off foreign material, the filtering wall and spraying device being relatively rotatable.

10. In a device of the class described the combination with a rotatable drum containing a wall of woven fabric through which gas passes in one direction, of a stationary spraying device adapted to forcibly project a stream of water or other suitable washing fluid through the wall in a direction opposite to that in which the gas enters the wall and with sufficient force to agitate the wall and knock off foreign substances.

11. In a device of the class described the combination with a casing, a water tank and a gas inlet immediately above the water tank, of a filtering drum arranged above the water line in the tank and through the wall of which the gas filters into the interior thereof, a spraying device within the drum arranged to knock foreign matter from off the wall of the drum and an outlet from the drum for the filtered gas.

12. In a device of the class described the combination with a casing having a gas inlet pipe, and a plurality of perforated plates through which the gas passes, of a filtering drum, a spraying device within the drum, arranged to spray water through the wall of the drum in a direction opposite to that in which direction the gas enters the wall, said drum being so arranged that the escaping water will fall directly upon and through the perforated plates in a direction opposite to that in which the gas passes.

13. In a device of the class described the combination with a filtering drum having a gas outlet in one of its ends, of a water pipe entering said drum and containing a series of nozzles adapted to direct a spray through the wall of the drum, a gas receiving chamber surrounding the drum, and an inspirator controlled from without the casing and arranged to create a vacuum within the drum.

In witness whereof I have signed the above application for Letters Patent at Chicago, county of Cook and State of Illinois, this 14th day of January 1907.

CHARLES E. SARGENT.

Witnesses:
CHARLES O. SHERVEY,
WM. P. BOND.